(12) United States Patent
Connell et al.

(10) Patent No.: US 7,726,678 B1
(45) Date of Patent: Jun. 1, 2010

(54) SLIDING FIFTH WHEEL ASSEMBLY

(75) Inventors: Colin Connell, Lapeer, MI (US); Robert Hillman, Davison, MI (US)

(73) Assignee: Hensley Manufacturing, Inc., Davison, MI (US)

( * ) Notice: Subject to any disclaimer, the term of this patent is extended or adjusted under 35 U.S.C. 154(b) by 260 days.

(21) Appl. No.: 11/901,507

(22) Filed: Sep. 18, 2007

Related U.S. Application Data

(60) Provisional application No. 60/845,613, filed on Sep. 19, 2006.

(51) Int. Cl.
*B62D 53/08* (2006.01)

(52) U.S. Cl. ................ 280/441; 280/438.1; 280/433

(58) Field of Classification Search ............... 280/441, 280/438.1, 433, 407
See application file for complete search history.

(56) References Cited

U.S. PATENT DOCUMENTS

| | | | | |
|---|---|---|---|---|
| 2,317,508 A * | 4/1943 | Zoder | ............. | 280/407 |
| 2,391,372 A * | 12/1945 | Weigand | ............. | 280/438.1 |
| 2,807,477 A * | 9/1957 | Tuso, Jr. | ............. | 280/407 |
| 3,843,159 A * | 10/1974 | Hood, II | ............. | 280/407 |
| 3,869,147 A * | 3/1975 | Fry | ............. | 280/438.1 |
| 4,429,892 A | 2/1984 | Frampton et al. | | |
| 4,614,355 A | 9/1986 | Koch | | |
| 5,417,308 A * | 5/1995 | Hartl | ............. | 184/6.4 |
| 5,839,745 A * | 11/1998 | Cattau et al. | ............. | 280/434 |
| 5,863,057 A | 1/1999 | Wessels | | |
| 6,203,045 B1 | 3/2001 | Kyrtsos et al. | | |
| 6,231,064 B1 | 5/2001 | Curry | | |
| 6,308,977 B1 | 10/2001 | Pulliam et al. | | |
| 6,357,777 B1 | 3/2002 | Linger et al. | | |
| 6,398,250 B1 | 6/2002 | Hashman | | |
| 6,485,045 B1 * | 11/2002 | King | ............. | 280/417.1 |
| 6,488,305 B2 | 12/2002 | Laarman | | |
| 6,554,310 B2 * | 4/2003 | Babin | ............. | 280/441.1 |
| 6,736,420 B2 | 5/2004 | Laarman et al. | | |
| 6,935,650 B2 | 8/2005 | Grinde et al. | | |
| 7,384,056 B2 * | 6/2008 | Anderson | ............. | 280/441 |
| 2003/0067139 A1 * | 4/2003 | Hosmer | ............. | 280/433 |
| 2004/0173992 A1 | 9/2004 | Stunder et al. | | |
| 2005/0248124 A1 * | 11/2005 | Phillips et al. | ............. | 280/477 |
| 2006/0043694 A1 | 3/2006 | Kaun | | |

* cited by examiner

*Primary Examiner*—Lesley Morris
*Assistant Examiner*—Maurice Williams
(74) *Attorney, Agent, or Firm*—Young, Basile, Hanlon & MacFarlane, P.C.

(57) ABSTRACT

A sliding fifth wheel assembly for slidably connecting a trailer hitch to a vehicle, comprising at least one rail connectable to the vehicle and a platform connectable to the trailer hitch. The platform is slidably mounted to the rail for movement between a forward position and a rearward position. At least one stop bar is connected to the platform, and at least one locking bar is pivotally mounted to the rail for selective engagement with the stop bar to retain the platform in either the forward position or the rearward position. The locking bar may be selectively engaged by at least one actuator.

18 Claims, 6 Drawing Sheets

SLIDING FIFTH WHEEL ASSEMBLY

CROSS-REFERENCE TO RELATED APPLICATIONS

This application claims the benefit of U.S. Provisional Application No. 60/845,613, filed Sep. 19, 2006.

FIELD OF THE INVENTION

The present invention relates to the field of trailer hitches, and more particularly, the present invention relates to a sliding fifth wheel assembly for slidably connecting a trailer hitch to a vehicle.

BACKGROUND OF THE INVENTION

Although most commonly associated with semi trailers, fifth wheel trailers are often used as recreational vehicles, in conjunction with a towing vehicle, such as a conventional pickup truck. Fifth wheel trailers have a forward portion, which extends over the towing vehicle, and a kingpin that extends downward from the forward portion of the fifth wheel trailer for engagement with a fifth wheel trailer hitch that is attached to the towing vehicle. The fifth wheel trailer hitch is typically mounted directly above or slightly forward of the rear axle of the towing vehicle, in order to maintain a weight distribution that provides optimal ride characteristics and fuel economy.

When maneuvering the towing vehicle at low speeds, for example, when in parking lots or urban environments, sufficient clearance must be present between the fifth wheel trailer hitch and the cab of the towing vehicle so that the fifth wheel trailer does not contact the cab of the truck during sharp turns. When fifth wheel trailers are towed by pickup trucks having a standard eight-foot long bed, sufficient distance is present to allow clearance of the fifth wheel trailer with respect to the cab of the truck during sharp turns. However, when pickup trucks having six foot long "short-beds" are used as towing vehicles, the trailer hitch cannot be positioned sufficiently rearward to allow clearance during sharp turns while preserving fuel economy and ride quality.

In order to address this problem, previous designs have mounted a fifth wheel trailer hitch to rails, wherein the fifth wheel hitch may move between forward and rearward positions to allow the hitch to be temporarily moved rearward, away from the truck cab, thereby providing the necessary clearance between the rear of the truck cab and the front of the trailer during sharp turns. These mechanisms typically include locking pins, which hold the mechanism in either the forward or rearward position. However, operation of this type of mechanism requires that the vehicle operator exit the vehicle, manually remove one or more locking pins, reenter the vehicle, move the towing vehicle forward or aft, and then exit the vehicle to reinsert the locking pins to secure the sliding mechanism in place.

It would be desirable to have a sliding fifth wheel assembly for securing a fifth wheel trailer hitch in either a forward or a rearward position, wherein the fifth wheel trailer hitch could be moved between the forward and rearward positions without requiring the operator of the vehicle to exit the vehicle.

SUMMARY OF THE INVENTION

The present invention provides a sliding fifth wheel assembly for slidably connecting a trailer hitch to a vehicle. At least one rail is connectable to the vehicle, and a platform is connectable to the trailer hitch, wherein the platform is slidably mounted to the rail for movement between a forward position and a rearward position. At least one stop bar is connected to the platform, and at least one locking bar is pivotally mounted to the rail for selective engagement with the stop bar to retain the platform in either the forward position or the rearward position. The sliding fifth wheel assembly also has at least one actuator for selectively engaging the locking bar.

The locking bar is pivotal between a first position, wherein the locking bar is engageable with the stop bar to retain the platform in the forward position, and a second position, wherein the locking bar is engageable with the stop bar to retain the platform in the rearward position. Furthermore, the locking bar may have a first portion and a second portion, wherein the first portion of the locking bar is engageable with the stop bar and the second portion of the locking bar is spaced from the stop bar when the locking bar is in the first position, and wherein the second portion of the locking bar is engageable with the stop bar and the first portion of the locking bar is spaced from the stop bar when the locking bar is in the second position. Thus, the first portion of the locking bar is engageable with the stop bar to retain the platform in the forward position, and the second portion of the locking bar is engageable with the stop bar to retain the platform in the rearward position. Additionally, when the locking bar is in the first position, the first portion of the locking bar extends at an acute angle with respect to the platform, and when the locking bar is in the second position, the second portion of the locking bar extends at an acute angle with respect to the platform.

The actuator is operative to move the locking bar between the first position and the second position. Furthermore, the actuator may have a fluid operated piston connected to the locking bar, or the actuator may have an electric motor connected to the locking bar. Furthermore, a switch may be mounted remotely from the actuator and in communication with the actuator for controlling the actuator.

BRIEF DESCRIPTION OF THE DRAWINGS

The description herein makes reference to the accompanying drawings wherein like referenced numerals refer to like parts throughout several views and wherein.

DESCRIPTION OF THE PREFERRED EMBODIMENT

Figure 1:
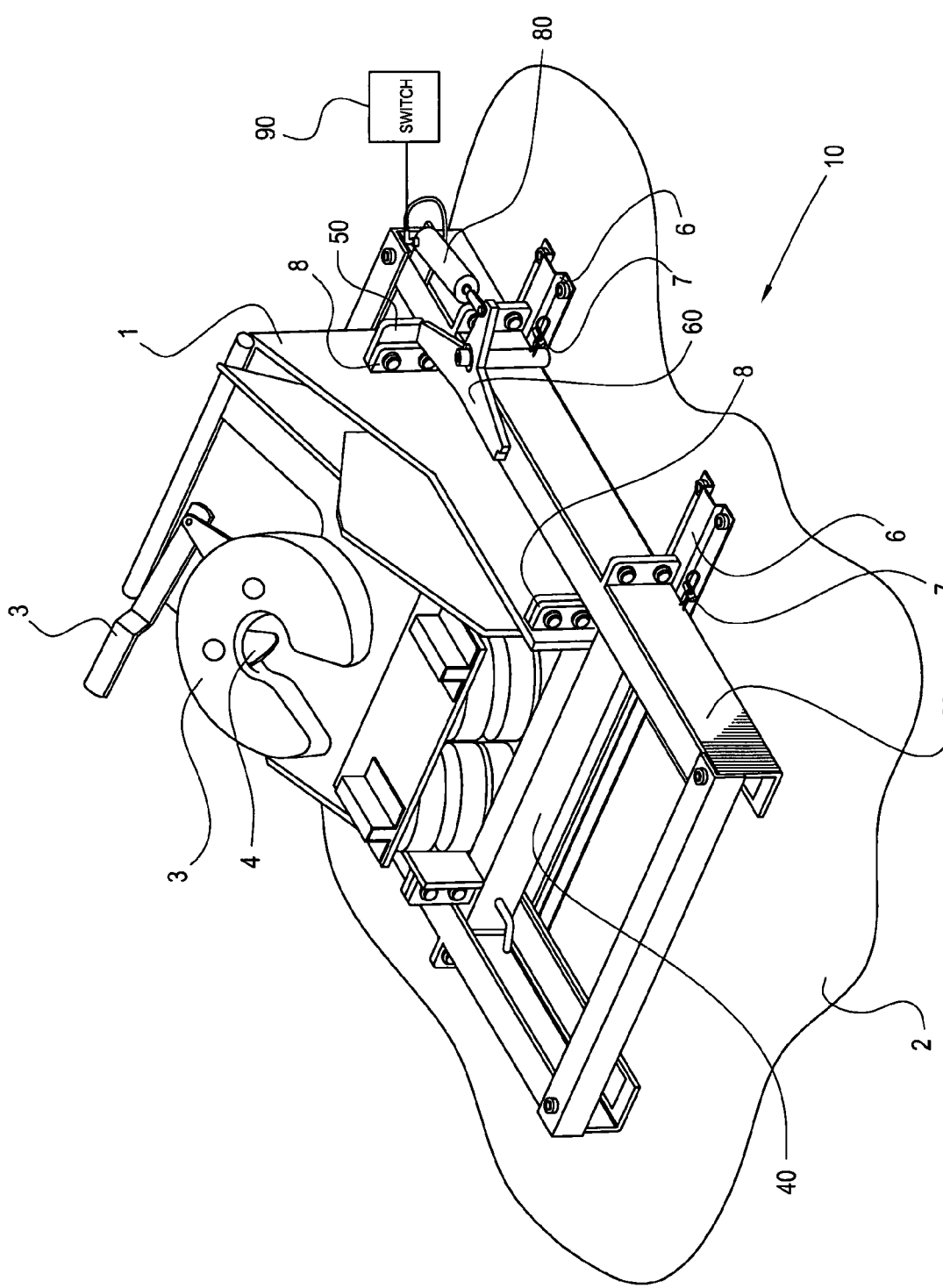
FIG. 1 is an illustration showing the sliding fifth wheel assembly of the present invention connected to a fifth wheel trailer hitch.

Referring to the drawings, the present invention will now be described in detail with reference to the disclosed embodiment.

FIG. 1 shows a fifth wheel trailer hitch 1 connected to a towing vehicle 2 by the sliding fifth wheel assembly 10 of the present invention. The fifth wheel trailer hitch 1 may be any conventional fifth wheel trailer hitch, as are well known in the art. The fifth wheel trailer hitch 1 includes a substantially U-shaped bearing member 3, in which the kingpin (not shown) of a fifth wheel trailer (not shown) may be received. In order to secure the fifth wheel trailer with respect to the towing vehicle 2, the fifth wheel trailer hitch 1 has a retainer 4 that operates to secure the kingpin in the bearing member 3. The retainer 4 may be selectively disengaged by a release lever 5.

The fifth wheel trailer hitch 1 is slidably mounted to the towing vehicle 2 by the sliding fifth-wheel assembly 10. The sliding fifth wheel assembly 10 has a frame 20, which is releasably connectable to the towing vehicle 2 using a pair of transverse mounting bars 6 that are permanently connected to the towing vehicle 2. The transverse mounting bars 6 are spaced apart from one another and substantially parallel to one another, and each transverse mounting bar 6 has a number of apertures for attaching the frame 20 to the transverse mounting bars 6 using appropriate fasteners 7. In order to connect the sliding fifth wheel assembly 10 to the trailer hitch 1, the sliding fifth wheel assembly 10 has a platform 40, and a plurality of mounting flanges 8 are provided on the trailer hitch 1 for connecting the trailer hitch 1 to the platform 40. The platform 40 is mounted to the frame 20 for movement between a forward position and a rearward position, wherein forward and rearward are defined with respect to the forward and rearward ends of the towing vehicle 2. In order to secure the sliding platform 40 in either the forward position or the rearward position, the sliding fifth wheel assembly 10 has a pair of locking bars 60 that are pivotally mounted to the frame 20 for selective engagement with at least one stop bar, such as a pair of stop bars 50, to retain the platform 40 in either the forward position or the rearward position. So that the sliding fifth wheel assembly 10 may be remotely operated, the sliding fifth wheel assembly 10 has at least one actuator, and more particularly, a pair of actuators 80 connected to the pair of locking bars 60 for selectively engaging the pair of locking bars 60.

Figure 2:
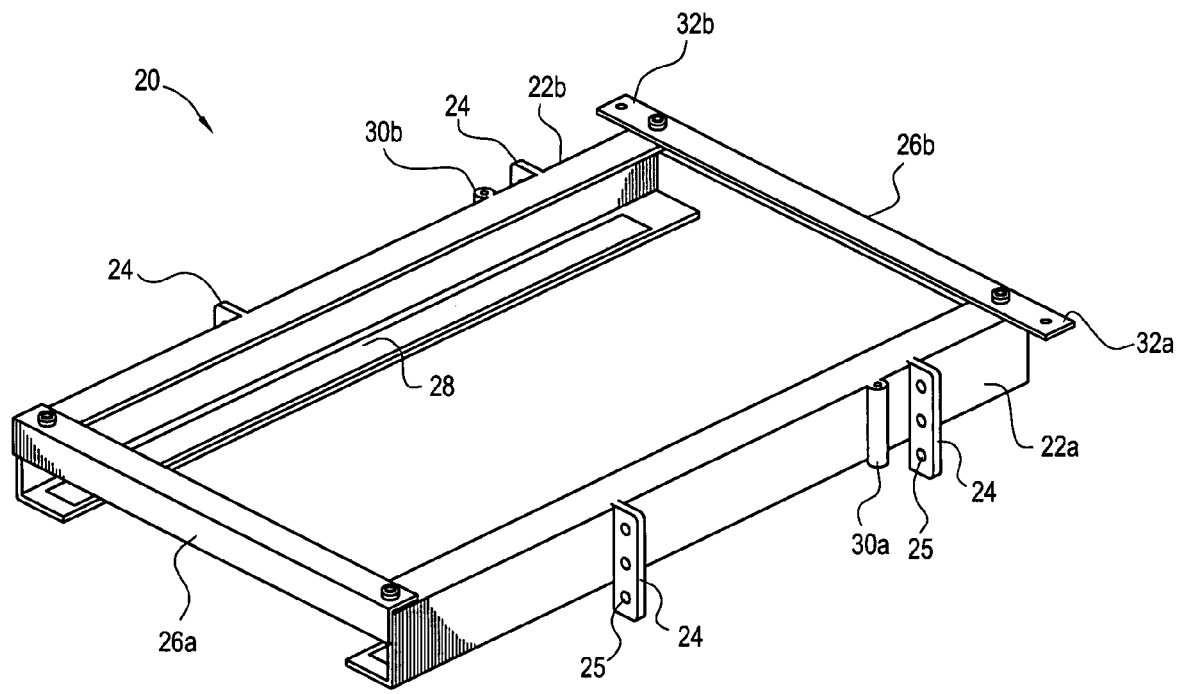
FIG. 2 is an illustration showing the frame of the sliding fifth wheel assembly of the present invention.

So that the platform 40 may be slidably mounted to the frame 20, the frame 20 has at least one rail, and more particularly, a pair of rails 22a, 22b, as shown in FIG. 2. The pair of rails 22a, 22b includes a first rail 22a that extends parallel to and is spaced from a second rail 22b. The first rail 22a and the second rail 22b may have substantially C-shaped cross-sections which extend along a longitudinal axis, wherein the open sides of the first rail 22a and the second rail 22b face one another, so that the platform 40 may be retained between the pair of rails 22a, 22b. To secure the frame 20 to the towing vehicle 2, a plurality of mounting flanges 24 are connected to the first rail 22a and the second rail 22b. The plurality of mounting flanges 24 extend substantially perpendicular to the first rail 22a and the second rail 22b. An aperture 25 is formed in each mounting flange 24 so that a respective fastener 7 may secure each mounting flange 24 to one of the transverse mounting bars 6. In order to connect the first rail 22a to the second rail 22b, as well as to retain the platform 40 on the frame 20, a pair of cross-braces 26a, 26b that includes a front cross-brace 26a and a rear cross-brace 26b that extend between and are connected to the first rail 22a and the second rail 22b. The cross braces 26a, 26b are rigid members that at least partially obstruct the ends of the rails 22a, 22b so that the cross braces 26a, 26b may engage the platform 40, thereby retaining the platform 40 on the frame 20.

In order to reduce sliding friction between the frame 20 and the platform 40, a bearing strip 28 may be disposed within each of the first rail 22a and the second rail 22b for slidably engaging the platform 40. The bearing strip 28 may be fabricated from a material having a low coefficient of friction, such as plastic.

In order to connect the locking bars 60 to the frame 20, the frame 20 has a pair of locking bar mounts 30a, 30b, particularly a first locking bar mount 30a connected to the first rail 22a and a second locking bar mount 30b connected to the second rail 22b. In order to connect the actuators 80 to the sliding frame 20, the sliding frame 20 has a pair of actuator mounts 32a, 32b, namely a first actuator mount 32a connected to the first rail 22a and a second actuator mount 32b connected to the second rail 22b.

Figure 3:
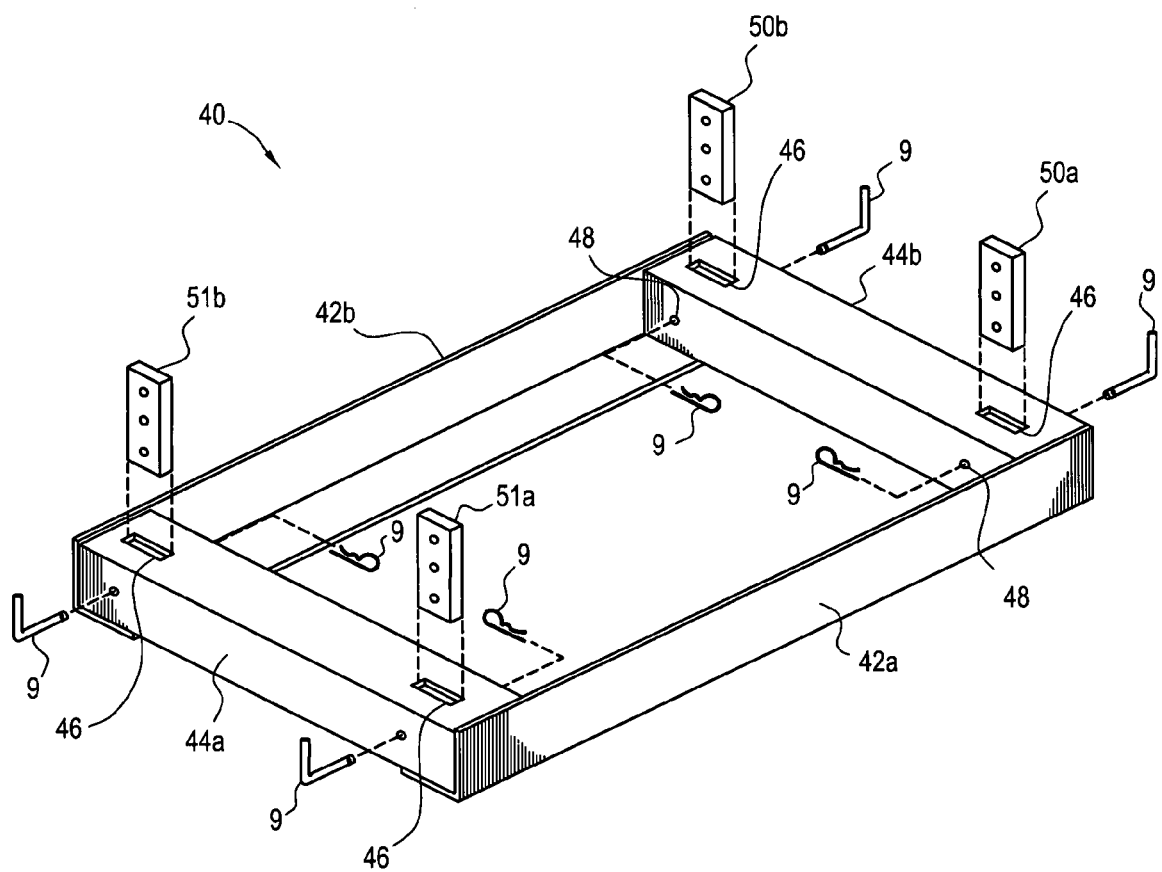
FIG. 3 is an illustration showing the platform of the sliding fifth wheel assembly of the present invention.

The platform 40 is connectable to the fifth wheel trailer hitch 1 and is slidably mounted to the frame 20 for movement between the forward position and the rearward position. So that the platform 40 may slide with respect to the frame 20, the platform 40 has a pair of bearing members 42a, 42b, namely a first bearing member 42a and a second bearing member 42b, as shown in FIG. 3. The first bearing member 42a and the second bearing member 42b are slidably disposed within the first rail 22a and the second rail 22b, respectively, and thus, the bearing members 42a, 42b are substantially parallel to one another and spaced apart from one another. The first bearing member 42a and the second bearing member 42b may be substantially planar elements, or the first bearing member 42a and the second bearing member 42b may have substantially L-shaped cross-sections which extend along a longitudinal axis. In this manner, the first bearing member 42a and the second bearing member 42b contact the bearing strips 28 in the first rail 22a and the second rail 22b so that the pair of bearing members 42a, 42b may slide with respect to the pair of rails 22a, 22b.

In order to connect the first bearing member 42a to the second bearing member 42b and further in order to support the fifth wheel trailer hitch 1, the platform 40 has a pair of crossbars 44a, 44b, namely a first crossbar 44a and a second crossbar 44b. The first crossbar 44a and the second crossbar 44b are located at the forward and rearward ends of the sliding platform 40, respectively. The pair of crossbars 44a, 44b are connected to the pair of bearing members 42a, 42b by conventional means, such as by welding or by fasteners. The first crossbar 44a and the second crossbar 44b may be substantially tubular in construction and may be square or rectangular in cross-section.

In order to secure the fifth wheel trailer hitch 1 to the platform 40, a plurality of slots 46 extend through the upper surfaces of the first crossbar 44a and the second crossbar 44b, and a corresponding plurality of apertures extend through the side surfaces of the first crossbar 44a and the second crossbar 44b. The lower ends of a pair of connecting plates 51a, 51b are adapted to extend through the slots 46 in the first crossbar 44a, and are secured thereto by a plurality of fasteners 9, which extend through the apertures 48 in the first crossbar 44a. The upper ends of the connecting plates 51a, 51b are connected to the mounting flanges 8 on the trailer hitch 1, for securing the trailer hitch 1 to the platform 40. The connection between the second crossbar 44b and the trailer hitch 1 is accomplished in a similar manner, except that the stop bars 50a, 50b are used in lieu of the connecting plates 51a, 51b. Thus, the lower ends of the stop bars 50a, 50b are adapted to extend through the slots 46 in the second crossbar 44b, and are secured thereto by a plurality of fasteners 9, which extend through the apertures 48 in the first crossbar 44a. The upper ends of the stop bars 50a, 50b are connected to the mounting flanges 8 on the trailer hitch 1, for securing the trailer hitch 1 to the platform 40.

Figure 4:
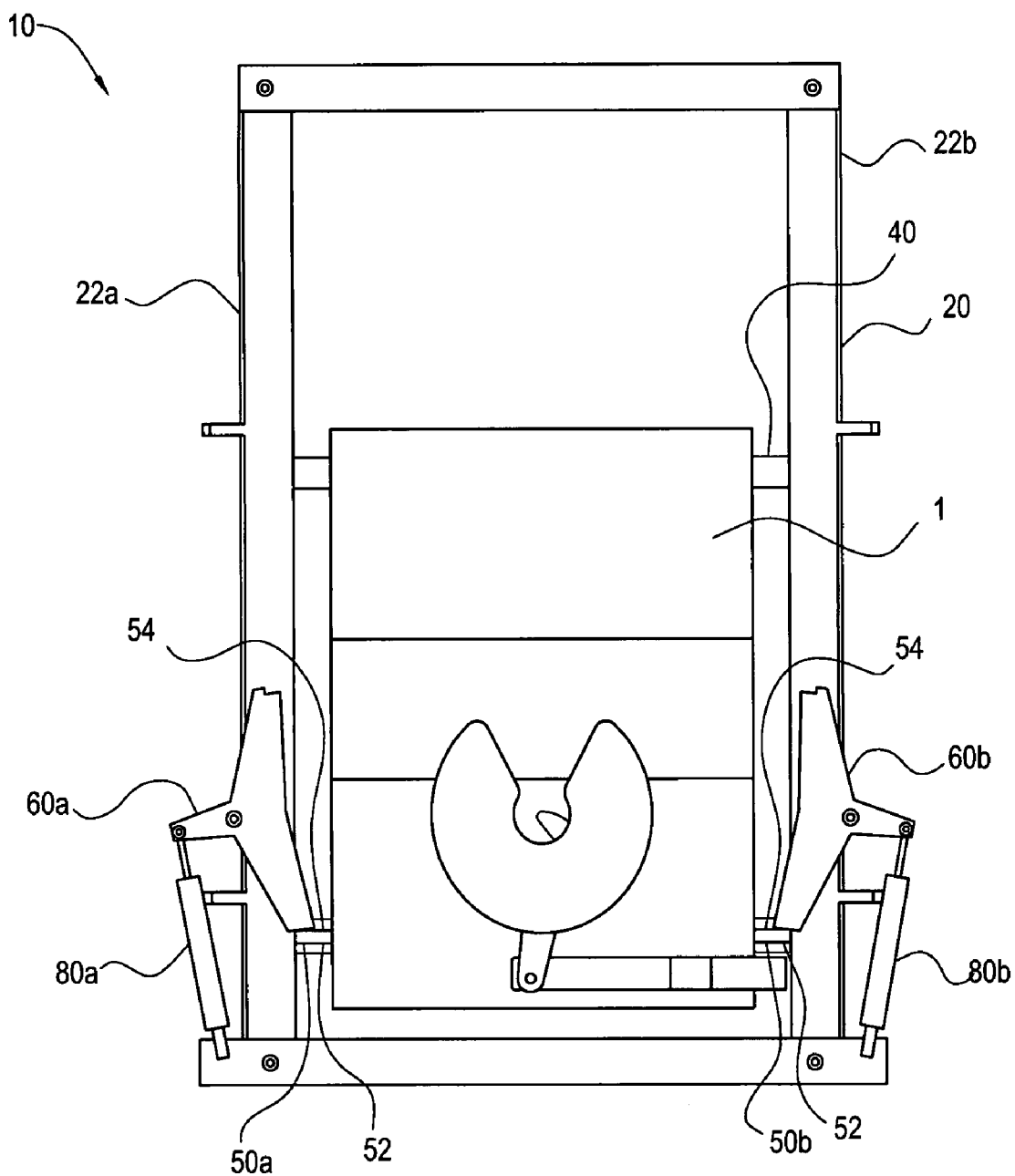
FIG. 4 is an illustration showing the locking bars of the sliding fifth wheel assembly of the present invention, wherein the platform is in the forward position.

In addition to connecting the platform 40 to the trailer hitch 1, the stop bars 50a, 50b also provide a contact surface for engagement of the locking bars 60a, 60b with the platform 40. In particular, the first stop bar 50a is connected to the platform 40 adjacent to the first bearing member 42a for engagement with the first locking bar 60a, and the second stop bar 50b is connected to the platform 40 adjacent to the second bearing member 42b for engagement with the second locking bar 60b, as seen in FIG. 4. The stop bars 50a, 50b may be any structures that are suitable to engage the pair of locking bars 60a, 60b. For example, the first and second stop bars 50a, 50b may be substantially planar members which extend substantially perpendicular to the longitudinal axis of the first rail 22a and the second rail 22b, and the first and second stop bars 50a, 50b may be rigidly connected to the platform 40. The pair of stop bars 50a, 50b have a front face 52, which faces the front end of the towing vehicle 2, and a rear face 54, which faces the rear end of the towing vehicle 2. It should be noted that although the stop bars 50a, 50b are described as being connected to the platform 40, it is contemplated that this connection need only be an operative connection, rather than a direct connection, and thus the stop bars may be indirectly connected to the platform 40. For example, the first stop bar 50a and the second stop bar 50b need not serve to connect the trailer hitch 1 to the platform 40, as other hardware could be provided for this purpose, and thus the stop bars 50a, 50b could be directly connected to the trailer hitch 40 independent of the mounting flanges 8. It should also be understood that the stop bars 50a, 50b could be rigidly connected to the platform 40 without being connected to the trailer hitch 1 directly. Thus, the only requirement as to the position and connection of the pair of stop bars 50a, 50b with respect to the platform 40 is that the pair of stop bars 50a, 50b must be in a substantially fixed relationship with respect to the platform 40, such that engagement of the locking bars 60a, 60b with the stop bars 50a, 50b is operative to restrain the platform 40 against sliding.

Figure 5:
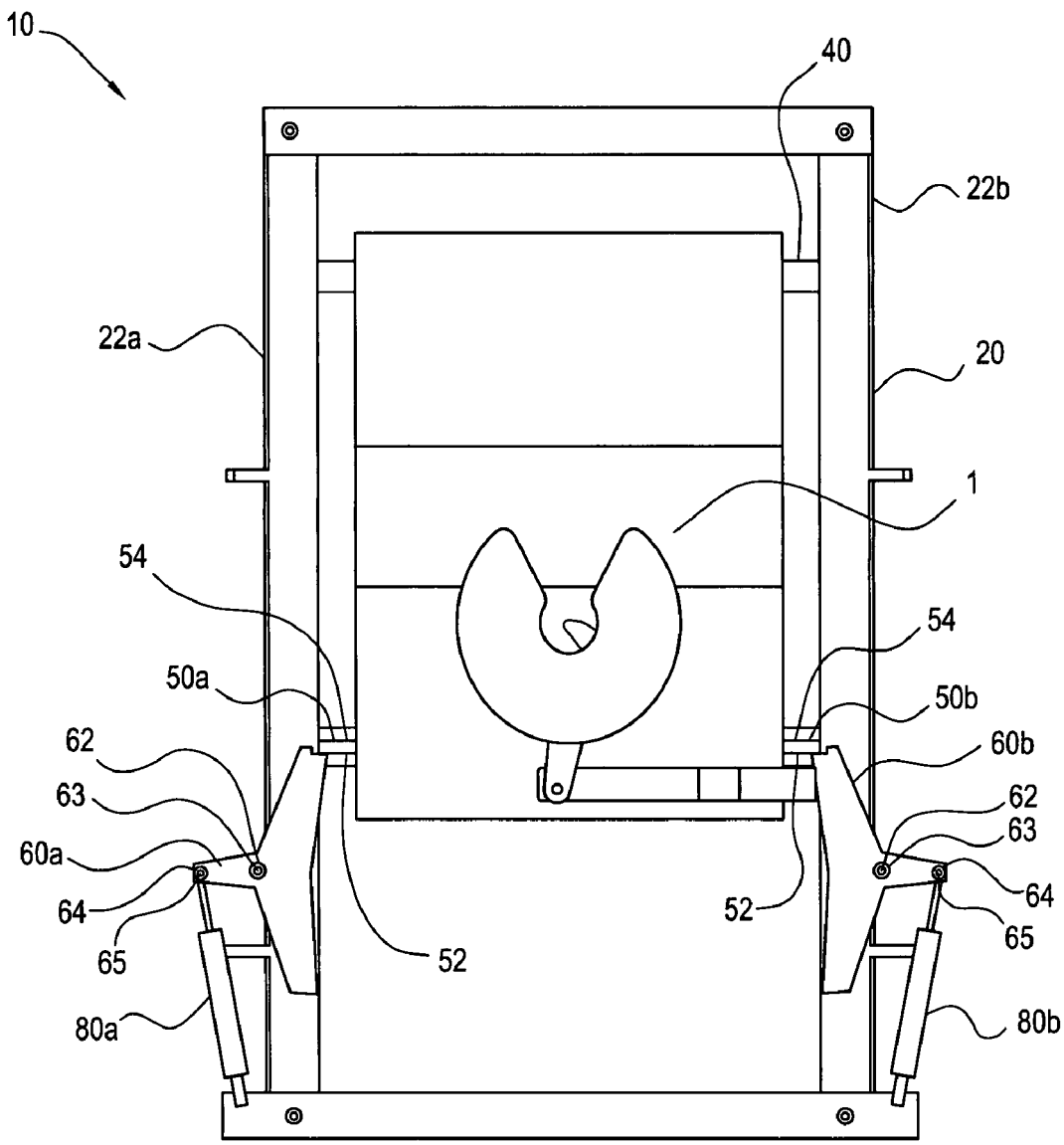
FIG. 5 is an illustration showing the locking bars of the sliding fifth wheel assembly of the present invention, wherein the platform is in the rearward position.

In order to retain the platform 40 in either the forward position or the rearward position, the pair of locking bars 60 includes a first locking bar 60a and a second locking bar 60b that are pivotally mounted to the pair of rails 22a, 22b, respectively, for selective engagement with the platform 40. The locking bars 60a, 60b are pivotal between a first position, as shown in FIG. 4, wherein the locking bars 60a, 60b are engageable with the stop bars 50a, 50b to retain the platform 40 in the forward position, and a second position, as shown in FIG. 5, wherein the locking bars 60a, 60b are engageable with the stop bars 50a, 50b to retain the platform 40 in the rearward position. The first locking bar 60a and the second locking bar 60b each have a mounting aperture 62 for receiving a mounting stud 63, which connects the first locking bar 60a and the second locking bar 60b to the first locking bar mount 30a and the second locking bar mount 30b, respectively. For connecting the pair of locking bars 60a, 60b to the pair of actuators 80a, 80b, an actuator aperture 64 extends through each of the first locking bar 60a and the second locking bar 60b for receiving fasteners 65 for connecting the pair of locking bars 60a, 60b to the pair of actuators 80a, 80b.

Figure 6:
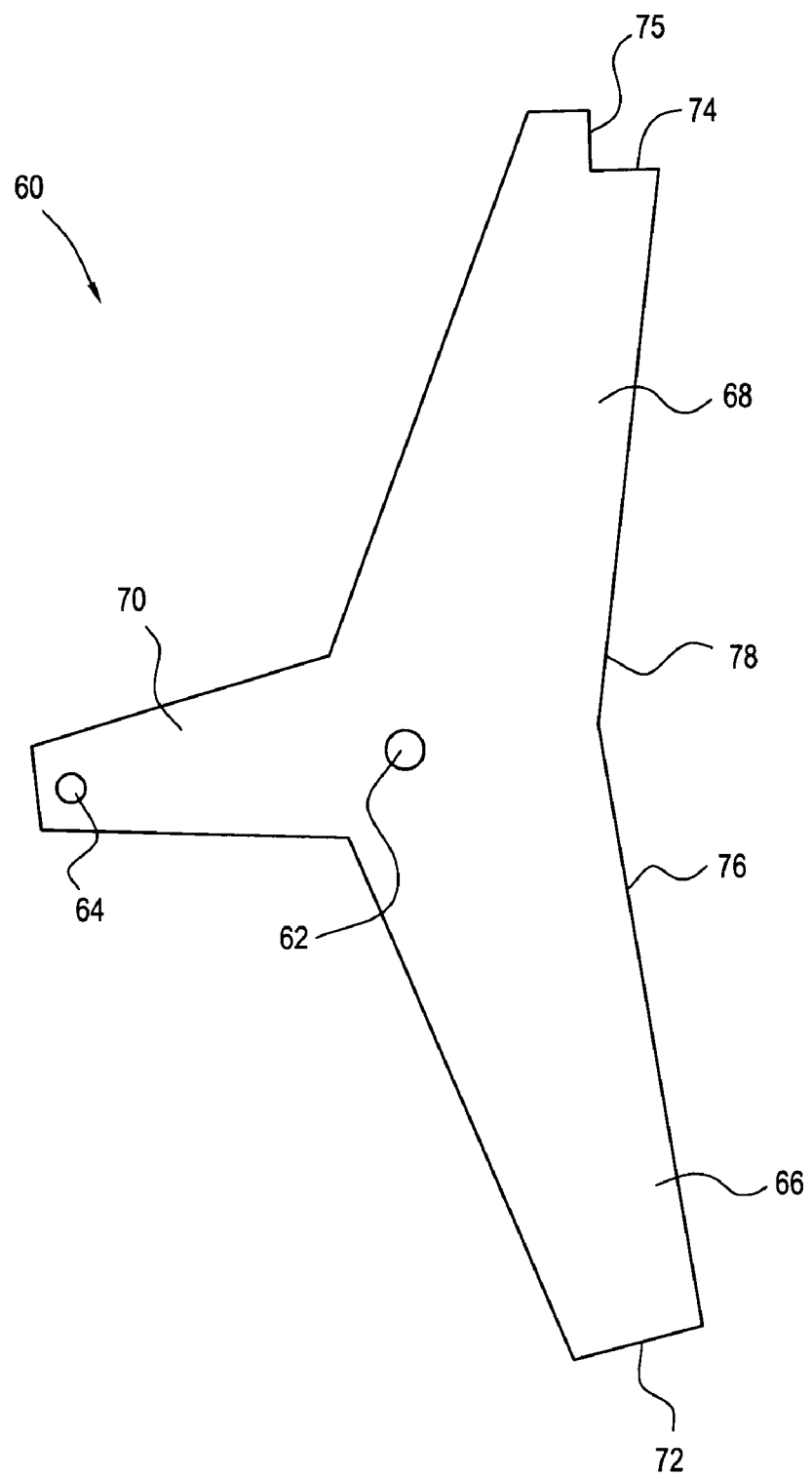
FIG. 6 is an illustration of a locking bar of the sliding fifth wheel assembly of the present invention.

Each locking bar 60 each has a first portion 66, a second portion 68, and a third portion 70, as shown in FIG. 6. The first portion 66, the second portion 68, and the third portion 70 of each locking bar 60 are fingerlike members that extend outward from the center of the locking bar 60, adjacent to the mounting aperture 62. The first portion 66 of each locking bar 60 has a front face 72 for engagement with the platform 40. Likewise, the second portion 68 of each locking bar 60 has a rear face 74 for engagement with the stop bars 50a, 50b. Furthermore, the second portion 68 of the locking bars 60 may include a notched face 75 for positioning the locking bars 60 in engagement with a respective one of the stop bars 50a, 50b. It should be understood, however, that a similar feature could also be provided on the first portion 66 of each locking bar 60. The first portion 66 of each locking bar 60 has a front interior face 76 that meets a rear interior face 78 of the second portion 68 of each locking bar 60 at an obtuse angle for controlling the pivotal motion of each locking bar 60 while the platform 40 moves between the forward and rearward positions, as will be described in detail herein.

The third portion 70 of each locking bars 60 meets the first and second portions 66, 68 at an angle, which may be an obtuse angle. The actuator aperture 64 is located near the outer end of the third portion 70 of each locking bar 60.

When the locking bars 60 are in the first position, the first portions 66 of the locking bars 60 are engageable with the rear faces 54 stop bars 50a, 50b to retain the platform 40 in the forward position. When the locking bars are in the second position, the second portions 68 of the locking bars 60 are engageable with the front faces 52 of the stop bars 50a, 50b to retain the platform 40 in the rearward position. When the locking bars 60 are in the first position, the first portion 66 of each of the locking bars 60 meets the platform 40 at an acute angle. When the locking bars 60 are in the second position, the second portion 68 of each of the locking bars 60 meets the platform 40 at an acute angle. According to the pivotal relationship of the locking bars 60 with respect to the platform 40, it follows that when the locking bars 60 are in the first position, the second portion 68 of each locking bar 60 is spaced from the platform 40, and when the locking bars 60 are in the second position, the first portion 66 of each locking bar 60 is spaced from the platform 40.

In order to move the pair of locking bars 60a, 60b between the first position and the second position, a pair of actuators 80a, 80b may be connected to the pair of locking bars 60, as seen with further reference to FIGS. 4-5. Particularly, a first actuator 80a is connected to the first locking bar 60a and a second actuator 80b is connected to the second locking bar 60b. The actuators 80a, 80b are connected to the locking bars 60a, 60b using the fasteners 65, which are seated in the actuator apertures 64 of the locking bars 60a, 60b, as previously described. The actuators 80 may be hydraulic, pneumatic, or electric devices operative to impart substantially linear motion to the third portion 70 of each of the locking bars 60a, 60b to thereby pivot the locking bars 60a, 60b with respect to the mounting stud 63. In this case, the mounting stud 63 would be fixedly mounted with respect to the frame 20 and pivotally mounted with respect to the locking bars 60a, 60b. It is also contemplated the actuators 80a, 80b could be connected directly to the mounting studs 63 to pivot the locking bars 60. In such an arrangement, the locking bars 60 would not require a third portion 70, and the mounting studs 63 would be fixedly mounted to the locking bars 60 and rotatably mounted with respect to the frame 20.

In order to allow selective engagement of the pair of locking bars 60a, 60b from a remote location, such as from within the cab of the towing vehicle 2, a switch 90 may be placed in communication with the actuators 80a, 80b. The actuators 80a, 80b respond to signals from the switch 90 by moving the locking bars 60a, 60b between the first position and the second position. In this manner, the operator of the towing vehicle 2 may move the locking bars 60 between the first position and the second position to move the platform 40 between the forward and rearward positions, without requiring the operator of the towing vehicle to leave the cab of the towing vehicle 2.

In use, the operator of the towing vehicle 2 connects the fifth wheel trailer to the towing vehicle 2 using the fifth wheel trailer hitch 1, which is mounted to the towing vehicle 2 by the sliding fifth wheel assembly 10. During over-the-road travel, the operator of the towing vehicle 2 places the sliding platform 40 in the forward position to provide proper weight distribution. In situations where the towing vehicle 2 must make sharp turns, the operator of the towing vehicle 2 places the platform 40 in the rearward position, in order to provide appropriate clearance between the fifth wheel trailer and the cab of the towing vehicle 2. When the platform 40 is in the forward position, the locking bars 60a, 60b are in the first position, wherein the first portions 66 of the locking bars 60a, 60b engage the rear faces 52 of the stop bars 50a, 50b to secure the platform 40 in the forward position. In the rearward position of the platform 40, the second portions 68 of the locking bars 60a, 60b engage the front faces 52 of the stop bars 50a, 50b to secure the platform 40 in the rearward position.

When the operator of the towing vehicle 2 wishes to move the platform 40 from the forward position to the rearward position, the operator first brings the towing vehicle 2 to a complete stop. The operator of the towing vehicle 2 then uses the switch 90 to operate the actuator 80 for controlling the actuator 80 to move the locking bars 60a, 60b from the first position to the second position. When the locking bars 60a, 60b reach the second position while the platform 40 is still in the forward position, the second portion 68 of each of the locking bars 60 comes into contact with the platform 40. The operator of the towing vehicle 2 then moves the towing vehicle 2 forward under power. Since the locking bars 60a, 60b are not engaging the stop bars 50a, 50b at this time, the platform 40 is not restrained against sliding with respect to the frame 20. Due to the weight of the fifth wheel trailer that is being exerted on the fifth wheel trailer hitch 1, the platform 40 begins to slide from the forward position toward the rearward position. As the platform 40 slides toward the rearward position, the stop bars 50a, 50b come into engagement with the rear interior faces 78 of the locking bars 60a, 60b. Although the actuators 80 are currently biasing the locking bars 60a, 60b toward engagement with the platform 40, engagement of the stop bars 50a, 50b with the rear interior faces 78 of the locking bars 60a, 60b overcomes the biasing force of the actuators 80 so that the stop bars 50a, 50b travel rearward past the second portion 68 of the locking bar 60a, 60b. Once the stop bars 50a, 50b have traveled rearward of the locking bar 60, the locking bars 60 pivot toward the stop bars 50a, 50b due to the biasing force of the actuators 80a, 80b. The second portions 68 of the locking bars 60a, 60b pivot toward the respective stop bar 50a, 50b until the notched faces 75 of the locking bars 60a, 60b come into contact with the stop bars 50, at which time the rear faces 74 of the locking bars 60a, 60b are engageable with the front faces 52 of the stop bars 50. In this manner, the sliding platform 40 is restrained against sliding forward. At this point, the operator of the towing vehicle 2 may commence operation of the towing vehicle 2, making sharp turns as necessary. While the platform 40 is in the rearward position, the rear cross-brace 26b is engageable with the sliding platform 40 to impart forward motion to the fifth wheel trailer, and the stop bars 50a, 50b are engageable with the platform 40 to impart rearward motion to the fifth wheel trailer.

When the operator of the towing vehicle 2 wishes to return the platform 40 to the forward position, the operator uses the switch 90 to control the actuators 80a, 80b, thereby moving the locking bar 60a, 60b from the second position to the first position, wherein the first portions 66 of each of the locking bars 60a, 60b engages the sliding platform 40. The operator then moves the towing vehicle 2 backward under its own power. As the operator does so, the platform 40 moves from the rearward position toward the forward position, by sliding with respect to the frame 20. When the stop bars 50a, 50b reach the front interior faces 76 of the first portions 66 of the locking bars 60a, 60b, engagement of the stop bars 50a, 50b with the locking bars 60a, 60b causes the locking bars 60 to pivot outward against the biasing force of the actuators 80a, 80b. Once the stop bars 50a, 50b have moved forward of the locking bars 60a, 60b, the locking bars 60a, 60b pivot toward the platform 40 and the trailer hitch 1, such that the front faces 72 of the locking bars 60a, 60b are then engageable with the rear faces 54 of the stop bars 50. The operator of the towing vehicle 2 may then operate the towing vehicle 2 normally. While the platform 40 is in the forward position, the stop bars 50a, 50b serve to help impart motion to the trailer while the towing vehicle 2 is moving in a forward direction, and the front cross-brace 26a helps to impart motion to the trailer while the towing vehicle 2 is moving in a rearward direction.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A sliding fifth wheel assembly for slidably connecting a trailer hitch to a vehicle, comprising:
    at least one rail connectable to the vehicle;
    a platform connectable to the trailer hitch, and said platform slidably mounted to said at least one rail for movement between a forward position and a rearward position;
    at least one stop bar connected to said platform;
    at least one locking bar pivotally mounted to said at least one rail for selective engagement with said at least one stop bar to retain said platform in either said forward position or said rearward position;
    at least one actuator for selectively engaging said at least one locking bar; and
    said at least one locking bar having a first portion and a second portion, wherein said at least one locking bar is pivotally moveable between a first position, wherein said first portion of said at least one locking bar extends at an acute angle with respect to an edge of said platform, and a second position, wherein said second portion of said locking bar extends at an acute angle with respect to an edge of said platform.

2. The sliding fifth wheel assembly stated in claim 1, wherein said at least one locking bar is pivotally moveable between the first position, wherein said at least one locking bar is engageable with said at least one stop bar to retain said platform in said forward position, and the second position, wherein said at least one locking bar is engageable with said at least one stop bar to retain said platform in said rearward position.

3. The sliding fifth wheel assembly stated in claim 2, wherein said at least one actuator is operative to move said at least one locking bar between said first position and said second position.

4. The sliding fifth wheel assembly stated in claim 3, wherein said at least one actuator has a fluid-operated piston that is connected to said locking bar.

5. The sliding fifth wheel assembly stated in claim 3, wherein said at least one actuator has an electric motor that is connected to said at least one locking bar.

6. The sliding fifth wheel assembly stated in claim 3, further comprising:
a switch mounted remotely from said at least one actuator and in communication with said at least one actuator for controlling said at least one actuator.

7. The sliding fifth wheel assembly stated in claim 1, wherein said at least one locking bar has a first portion and a second portion, and said at least one locking bar is pivotally moveable between the first position, wherein said first portion of said at least one locking bar is engageable with said at least one stop bar and said second portion of said at least one locking bar is spaced from said at least one stop bar, and the second position, wherein said second portion of said at least one locking bar is engageable with said at least one stop bar and said first portion of said at least one locking bar is spaced from said at least one stop bar.

8. The sliding fifth wheel assembly stated in claim 1, wherein said first portion of said at least one locking bar is engageable with said at least one stop bar to retain said platform in said forward position, and said second portion of said at least one locking bar is engageable with said at least one stop bar to retain said platform in said rearward position.

9. A sliding fifth wheel assembly for slidably connecting a trailer hitch to a vehicle, comprising:
at least one rail connectable to the vehicle;
a platform connectable to the trailer hitch, and said platform slidably mounted to said at least one rail for movement between a forward position and a rearward position;
at least one stop bar connected to said platform;
at least one locking bar having a first portion and a second portion pivotally connected to said at least one rail for selectively pivoting said at least one locking bar between a first position, wherein said first portion of said at least one locking bar extends at an acute angle with respect to an edge of said platform and is engageable with said at least one stop bar for retaining said platform in said forward position, and a second position, wherein said second portion of said at least one locking bar extends at an acute angle with respect to said an edge of platform and is engageable with said at least one stop bar for retaining said platform in said rearward position; and
at least one actuator for pivoting said at least one locking bar between said first position and said second position.

10. The sliding fifth wheel assembly stated in claim 9, wherein said at least one stop bar has a front face and a rear face, said front face of said at least one stop bar is engageable with said second portion of said at least one locking bar, and said rear face of said at least one stop bar is engageable with said first portion of said at least one locking bar.

11. The sliding fifth wheel assembly stated in claim 9, wherein said at least one actuator has a fluid-operated piston that is connected to said locking bar.

12. The sliding fifth wheel assembly stated in claim 9, further comprising:
a switch mounted remotely from said at least one actuator and in communication with said at least one actuator for controlling said at least one actuator.

13. The sliding fifth wheel assembly stated in claim 9, wherein said at least one actuator has an electric motor that is connected to said at least one locking bar.

14. The sliding fifth wheel assembly stated in claim 9, wherein said first portion of said at least one locking bar is engageable with said at least one stop bar and said second portion of said at least one locking bar is spaced from said at least one stop bar when said at least one locking bar is in said first position, and said second portion of said at least one locking bar is engageable with said at least one stop bar and said first portion of said at least one locking bar is spaced from said at least one platform when said at least one locking bar is in said second position.

15. A sliding fifth wheel assembly for slidably connecting a trailer hitch to a vehicle, comprising:
a pair of rails having a first rail parallel to and spaced from a second rail, and said pair of rails connectable to the vehicle;
a platform connectable to the trailer hitch, and said platform slidably mounted on said pair of rails for movement between a forward position and a rearward position;
a pair of stop bars connected to opposite sides of said platform, having a first stop bar adjacent to said first rail and a second stop bar adjacent to said second rail, and each of said pair of stop bars having a front face and a rear face;
a pair of locking bars having a first locking bar pivotally mounted to said first rail and a second locking bar pivotally mounted to said second rail, said pair of locking bars each having a first portion and a second portion, and said pair of locking bars selectively pivotal between a first position, wherein said first portion of each of said pair of locking bars extends at an acute angle with respect to an edge of said platform and is engageable with said rear face of each of said pair of stop bars for retaining said platform in said forward position, and a second position wherein said second portion of each of said pair of locking bars extends at an acute angle with respect to an edge of said platform and is engageable with said front face of each of said pair of stop bars for retaining said platform in said rearward position; and
a pair of actuators having a first actuator for pivoting said first locking bar between said first position and said second position, and a second actuator for pivoting said second locking bar between said first position and said second position.

16. The sliding fifth wheel assembly stated in claim 15, wherein said pair of locking bars each has a third portion extending at an angle with respect to said first portion and said second portion of said pair of locking bars, and said third portions of said first and second locking bars connected to said first and second actuators, respectively.

17. The sliding fifth wheel assembly stated in claim 15, wherein said first and second actuators each has a fluid-operated piston that is connected to a respective locking bar of said pair of locking bars.

18. The sliding fifth wheel assembly stated in claim 15, further comprising:
a switch mounted remotely from said actuator and in communication with said actuator for controlling said actuator.

* * * * *